United States Patent
Marshall

[15] 3,703,318
[45] Nov. 21, 1972

[54] RETAINING MEANS FOR WHEEL TRIM MEMBERS

[72] Inventor: Claude J. Marshall, Ann Arbor, Mich.

[73] Assignee: North American Rockwell Corporation, Pittsburgh, Pa.

[22] Filed: Sept. 28, 1970

[21] Appl. No.: 76,291

Related U.S. Application Data

[63] Continuation-in-part of Ser. No. 763,224, Sept. 27, 1968, abandoned.

[52] U.S. Cl. .................................................. 301/37 R
[51] Int. Cl. .................................................. B60b 7/06
[58] Field of Search ........................ 301/37 R, 37 SS

[56] References Cited

UNITED STATES PATENTS

| | | |
|---|---|---|
| 2,698,203 | 12/1954 | Landell ........................ 301/37 |
| 2,709,113 | 5/1955 | Plotkin .................... 301/37 SS |
| 2,719,757 | 10/1955 | Gaylord ........................ 301/37 |
| 3,037,816 | 6/1962 | Mulhern ........................ 301/37 |
| 3,083,061 | 3/1963 | Buechler ...................... 301/37 |
| 3,168,349 | 2/1965 | Maletzke ...................... 301/37 |
| 3,174,803 | 3/1965 | Mulhern .................. 301/37 SS |
| 3,425,747 | 2/1969 | Alfes ............................ 301/37 |
| 2,732,262 | 1/1965 | Buerger ........................ 301/37 |

*Primary Examiner*—Richard J. Johnson
*Attorney*—E. Dennis O'Connor

[57] ABSTRACT

A wheel trim member including a cover portion having a circular outer margin, a substantially rigid annular ring extending axially from the outer margin, and a plurality of independent, angularly spaced-apart retaining members for resiliently retaining the trim member on a wheel, each of the individual retaining members including a base secured to the rigid ring, at least one flexible portion projecting outwardly from the base to engage the wheel, and a substantially rigid portion extending radially outwardly from the base for limiting the deflection of the flexible portions under shock load conditions.

2 Claims, 9 Drawing Figures

PATENTED NOV 21 1972

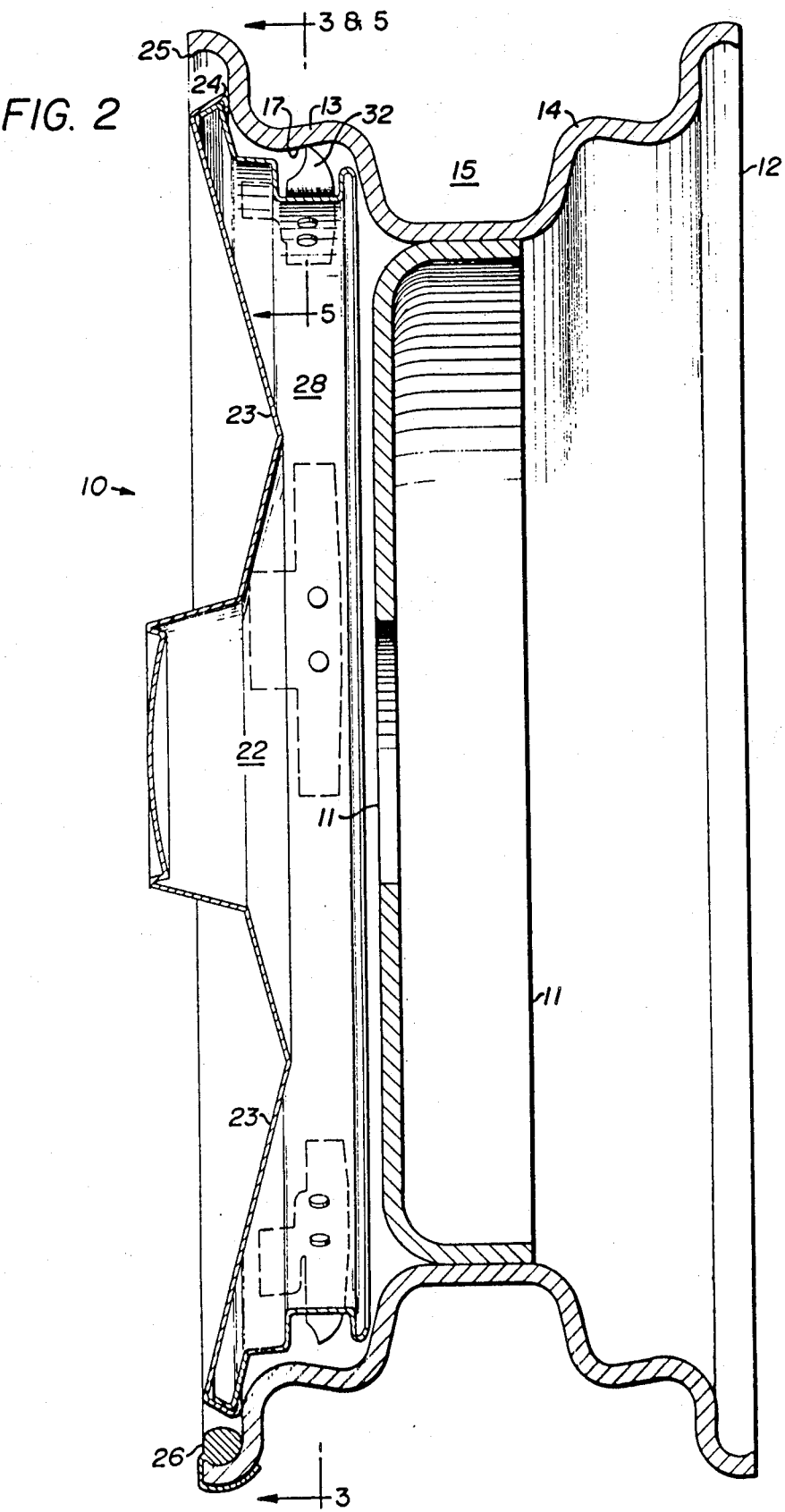

PATENTED NOV 21 1972 3,703,318

RETAINING MEANS FOR WHEEL TRIM MEMBERS

This is a continuation of U.S. Pat. application Ser. NO. 763,224, filed Sept. 27, 1968, now abandoned.

This invention relates to wheel trim members for motor vehicles and, more particularly, to improved retention devices for maintaining wheel trim members in proper position on a wheel rim, the retention devices being independent members permanently secured to the trim member in a sufficient, but not excessive, number to provide proper retention.

Conventional wheel trim members, including full wheel covers, are relatively lightweight devices having relatively flexible outer margins including spring means for resiliently engaging the wheel rim to maintain the trim member in position. In some cases, the spring means is comprised of sheet metal projections formed integrally with the outer margins, and in other cases, the spring means is comprised of independent elements mounted on the flexible periphery of the trim member. These prior art approaches have not been altogether satisfactory when applied to very heavy ornamented wheel covers. It has been found that heavy wheel trim members retained by such devices are quite easily dislodged and lost, vertical shock loads on the wheel cover often causing excessive deflection of the spring means and release of the wheel cover.

It is therefore an object of this invention to provide improved retention means for maintaining wheel trim members in proper position on a vehicle wheel.

Another object is to provide an improved retention means for maintaining wheel covers in position under shock loads.

Still another object of this invention is to retain a heavy wheel trim member in proper position without the use of extremely heavy retention devices.

Yet another object is to provide an improved retention system for wheel covers and other wheel trim members that is effective, versatile and reliable.

A still further object of this invention is to provide improved low cost means for maintaining both light and heavy trim members in proper position on a vehicle wheel.

Briefly stated, carrying out the invention in one form, a wheel trim member for mounting on a tire rim having an annular radially inwardly facing flange surface includes a cover portion having a circular outer margin, a substantially rigid annular ring extending axially from the outer margin for coaxial nesting within the wheel flange surface, and a plurality of angularly spaced-apart independent retaining members secured to the ring and extending radially outward thereof to resiliently engage the flange surface to retain the wheel cover in position on the wheel. Each of the retaining members includes a base secured to the ring and at least one flexible portion movable through a range of positions bounded by an unflexed position and a fully flexed position. In their unflexed positions, the flexible portions extend to a diameter larger than that of the flange surface, and in their fully flexed positions, the flexible portions extend to a diameter smaller than that of the flange surface. With the trim member mounted on the tire rim, the flexible members thus assume flexed positions intermediate their unflexed and fully flexed positions, the flexible members resiliently engaging the flange surface in their flexed positions to maintain the trim member in position. Each of the retaining members further includes a rigid portion extending radially outward of the base to a point radially intermediate the radially outermost extent of the respective flexible portion in its flexed and fully flexed positions to engage the flange surface and prevent movement of the flexible portions to their fully flexed positions under shock load conditions, thereby protecting the flexible portions from excessive and life shortening bending stresses.

By a further aspect of the invention, the rigid ring is of stepped configuration, including radially outwardly and inwardly opening channels for added rigidity. The bases of the retaining members are secured within the outwardly opening channel with the rigid portions and the flexible portions projecting radially outwardly of the channel. By still further aspects of the invention, the flexible portions are thin strips extending radially and circumferentially from the bases and terminating at their outer ends in means for bitingly engaging the flange surface, the engagement means preferably including at least one point projecting radially outward and axially toward the circular outer margin so as to permit relatively easy mounting and relatively difficult dismounting of the trim member. By a still further aspect of the invention, the retaining members can be manufactured from a material much harder than the tire rim such that the biting engagement between the retaining members and the flange surface is enhanced.

While the invention is distinctly claimed and particularly pointed out in the claims appended hereto, the invention will be better understood and appreciated, along with other objects and advantages thereof, from the following detailed description when considered in connection with the accompanying drawings, in which:

FIG. 2 is an enlarged cross-sectional view taken along viewing line 2—2 of FIG. 1;

Figure 1:
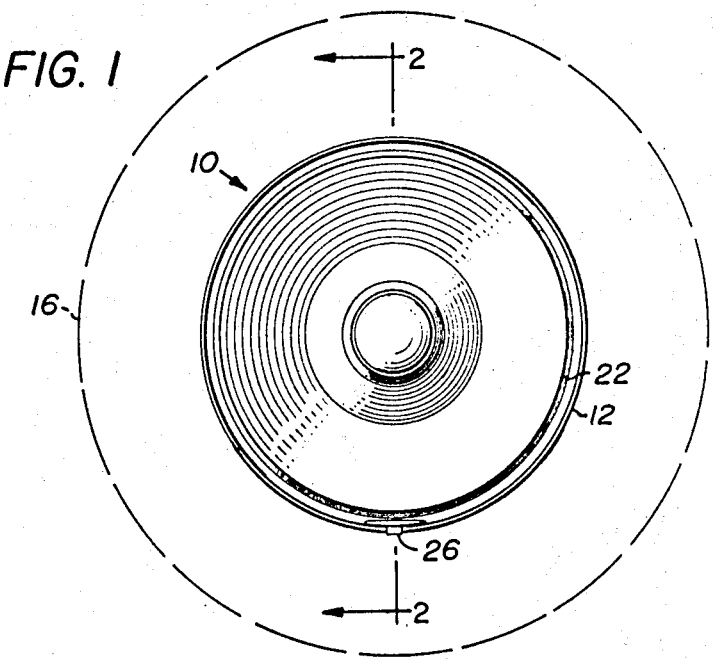
FIG. 1 is a side view of a wheel assembly having a trim member mounted thereon and retained by the retention system of this invention.
Figure 3:
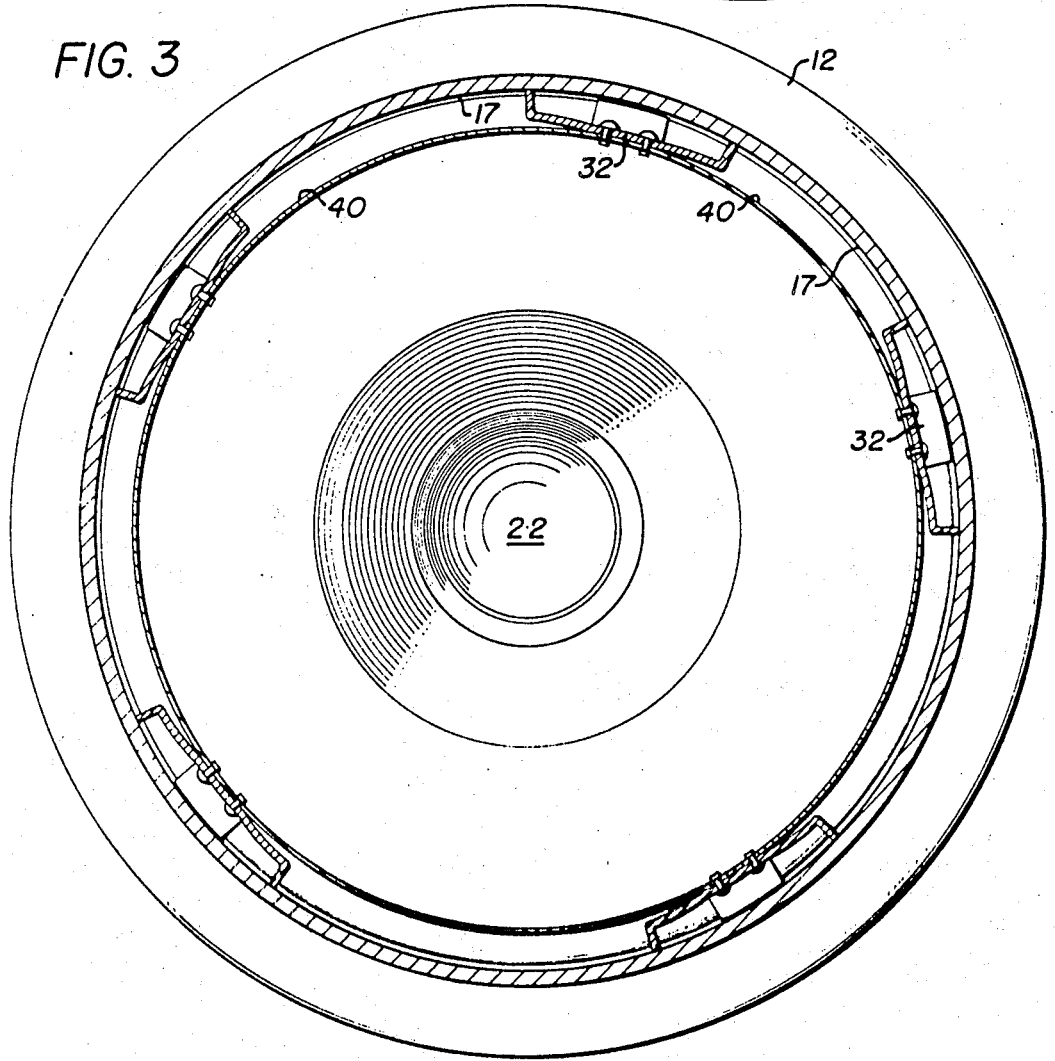
FIG. 3 is a reduced scale view taken along viewing line 3—3 of FIG. 2.

Referring first to FIGS. 1 and 2, a wheel assembly identified generally by the numeral 10 is illustrated, the assembly 10 including a hub 11 and an annular tire rim 12 peripherally secured to the hub 11. The tire rim 12 includes flanges 13 and 14 which extend radially and axially outwardly of the hub 11 to form an outwardly opening circumferential channel 15 within which a tire 16, illustrated in phantom, may be mounted. The wheel assembly 10 as just described is conventional, the flange 13 including an annular axially extending and radially inwardly facing flange surface 17, The particular flange surface 17 includes a maximum diameter portion 18 axially adjacent the hub 11 and a minimum diameter portion 19 axially remote from the hub 11, the two portions 18 and 19 smoothly merging into the continuous flange surface 17, but it will be appreciated as this specification proceeds that the flange surface 17 could alternatively be of uniform diameter. A heavy decorative wheel cover 22 is secured to the tire rim 12 to cover the hub 11 and flange 13, the wheel cover or trim member 22 including a cover portion 23 having a circular outer margin 24 of a diameter greater than that of the maximum diameter portion 18 of the flange surface 17, but preferably less than that of the outer margin 25 of the flange 13 so that, if desired, wheel weights 26 can be mounted on the outer margin 25 of the flange 13 without interfering with the trim member 22. The trim member 22 also includes an annular ring 28 which extends axially from the back side of the circular outer margin 24 of the cover portion 23 and has a maximum diameter portion 30 of smaller diameter than the minimum diameter portion 19 of the flange 17 so that the trim member 22 may be positioned as illustrated by FIG. 2 with the rigid ring 28 coaxially nested within the flange surface 17. The trim member 22 is secured to the tire rim 12 by a plurality of angularly spaced-apart retaining members 32 peripherally secured to the ring 28 and extending radially therefrom, as best shown by FIG. 3, to resiliently engage the flange surface 17 in a manner which will be described presently.

As indicated above, the trim member, or wheel cover, 22 is a heavy member which for satisfactory service must be maintained in proper position on the wheel assembly 10 under severe jolts and impacts, including vertical shock loads of the type encountered when the tire 16 strikes a pothole or other obstruction. If the wheel cover 22 and its retention system were similar to conventional wheel covers, it would be likely to pop off of the wheel assembly 10 under such load conditions because of its construction. The wheel cover 22, however, because of its rigidity and the unique retaining members 32, does not exhibit such a tendency. To appreciate the unique characteristics of the wheel cover 22 of this invention, attention is now directed to the rigid nature of the wheel cover with particular reference to FIGS. 2, 7 and 8. As illustrated, the rigid ring 28 is formed of formed sheet metal bent to provide a radially inwardly facing channel 34 adjacent the outer circular margin 24 and an outwardly facing channel 35. More particularly, the ring 28 has a plurality of interconnected annular walls 30, 38, 39 and 40. The wall 30 is the maximum diameter portion of the ring 28, the wall 30 being generally cylindrical and extending axially from the outer margin 24 to the radially outer edge 43 of the wall 38, which is a radially disposed wall parallel to an axially spaced-apart wall 39. The radially inner edges 44 and 45 of the walls 38 and 39, respectively, are interconnected by a wall 40, which is a generally cylindrical wall of smaller diameter than the wall 30. To further increase the rigidity of the wheel cover 22, the radially outer edge 47 of the wall 39 is reinforced by being rolled to form a continuous circumferential bead 48. By making the wheel cover 22 of sufficiently heavy gauge stock and by forming the ring 28 in the manner just described, the wheel cover 22 may be made extremely rigid.

The retaining members 32 are used in any desired multiple for holding the wheel cover 22 on the wheel assembly 10. More specifically, the wheel cover 22 illustrated is held by four equally angularly disposed members 32. If the wheel cover 22 were still heavier, it might be desired to utilize more retaining members, or, if it were lighter, as few as three retaining members. Since the members 32 are independent elements not formed integrally with the cover portion 23 and the ring 28, there is a wide degree of latitude in the use of the retaining members. Furthermore, since the same retaining members can be used for a wide variety of wheel covers, substantial savings may be made in the cost of manufacturing the retaining members. In this respect, it should be noted at this description proceeds that the design of the retaining members is such that they are easily manufactured with a minimum number of manufacturing operations.

The retaining members 32 will not be described in detail with particular reference to FIGS. 4–8. Each retaining member 32 is formed of a single piece of tempered high carbon sheet steel, the member 32 including a base portion 50 secured to the inner wall 40 of the ring 28 by rivets 52 or other suitable fastening devices, resilient legs 53 projecting circumferentially in opposite directions from the base portion 50, and a rigid portion 56 which extends radially outwardly from the base 50 in essential abutment with the wall 38 to the edge 43 from which it extends axially toward the outer margin 24 in essential abutment with the wall 30. Taken together, the radially outer surfaces 58 of the rigid portions 56 extend outwardly to a diameter approaching, but less than, the diameter of the flange portion 19. Accordingly, there is a small space 60 between the surfaces 58 and the flange surface 17 at assembly of the wheel cover 22 on the wheel assembly 10, this being best illustrated by FIG. 7. In a typical assembly in which the flange surface 17 has a diameter of approximately 14.630 to 14.680 inches, it has been found that these radial spaces 60 are preferably of the order of 0.005 to 0.050 inch.

Figure 5:
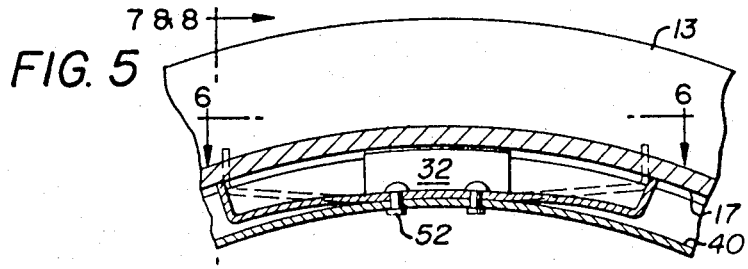
FIG. 5 is a view of the retention device of this invention taken along viewing line 5—5 of FIG. 2 showing the flexible portions in their flexed position by solid lines and in their unflexed position by broken lines.
Figure 6:
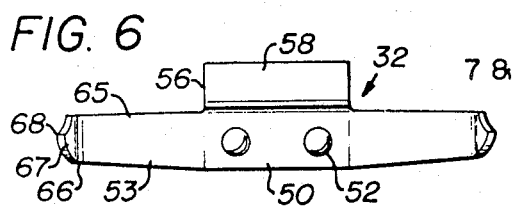
FIG. 6 is a view taken along viewing line 6—6 of FIG. 5.
Figure 4:
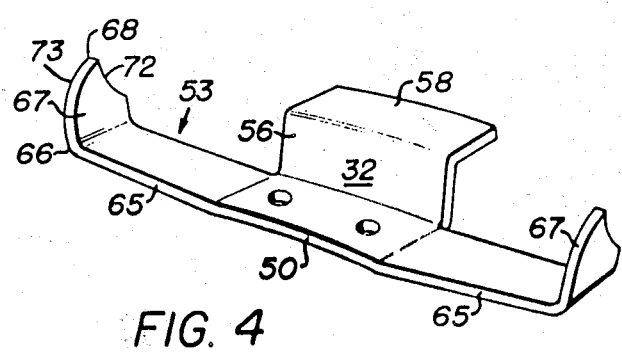
FIG. 4 is a perspective view of the retention device of this invention.

The resilient legs 53 are relatively thin flexible members having their widths disposed axially, the legs 53 including an elongated first leg portion 65 which, in the unflexed position illustrated by FIG. 4 and by broken lines in FIG. 5, extends circumferentially and radially outward from the base 50 to a remote end 66 and a second leg portion 67 extending essentially radially outward from the end 66. The second leg portion 67 terminates at its outer end in a point 68 for bitingly engaging the flange surface 17 when mounted on the wheel rim flange 13 in the position illustrated by the solid lines of FIG. 5 and by FIG. 7. This latter position is, of course, the normal, or flexed, position of the flexible legs 53 when the wheel cover 22 is mounted on the wheel assembly 10. This position is intermediate the unflexed position described above and a fully flexed position in which the leg portions 65 are deflected such that their ends 66 touch the cylindrical wall 40. In moving from the unflexed position and the flexed position, the flexible legs 53 "wind up" around the inner wall 40 and thereby exert a substantial outward biasing force on the second leg portions 67. The dimensions of the elements are such that the spaces 60 are significantly smaller than the spaces 70 between the ends 66 and the wall 40, the result being that the surfaces 58 strike the flange surface 17 under shock load conditions to relieve the legs 53 of excessive bending.

Figure 8:
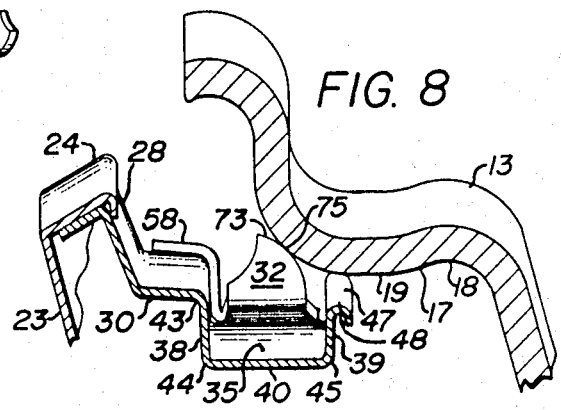
FIG. 8 is a view similar to FIG. 7 showing the retention device contacting the axially outer edge only of the tire rim flange surface.
Figure 7:
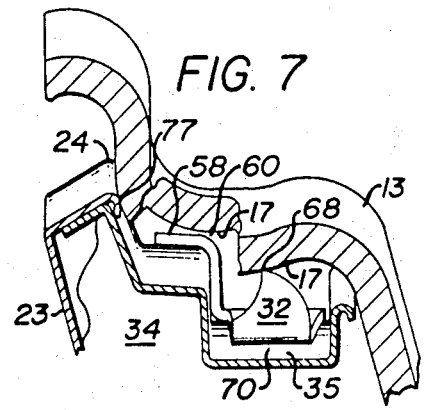
FIG. 7 is an enlarged view showing one of the retention devices engaging the tire rim, the retention device being viewed along viewing line 7—7 of FIG. 6.

With reference now to FIGS. 7 and 8, the point 68 of the second leg portion 67 is formed between the axial edges 72 and 73 of the strip, the edge 72 adjacent the circular outer margin 24 being concave and the edge 73 being convex so that the point 68 projects radially outwardly and axially toward the outer margin 24.

To mount the wheel cover 22 on the wheel assembly 10, the wheel cover 22 is positioned as illustrated by FIG. 8 with the flexible legs 53 in their unflexed positions, the convex edge 73 just contacting the axially outer margin 75 of the flange surface 17. Axial force is then applied to the wheel cover 22 so that the flexible legs 53 are biased radially inwardly to wind up around the wall 40 due to the cam action of the edge 73 riding along the flange surface 17 and the entire wheel cover 22 moves axially inwardly to the position illustrated by FIG. 7 in which further movement is prevented due to axial engagement between the circular margin 24 and the tire rim 12 at 77. Mounting of the wheel cover 22 on the wheel assembly 10 is relatively easy due to the cam action between the edge 73 and the surface 17. It is, however, relatively difficult to remove the wheel cover 22 since the point 68 is oriented so as to bite into the surface 17 under the biasing force exerted by the legs 53 rather than slip over it. In addition, this biting action is further enhanced since the retaining members 32, including the points 68, are substantially harder than the flange surface 17. More particularly, the retaining members 32 are preferably made of a material, such as SAE 1065 spring steel, having a hardness in the range of 42 to 47 Rc, this being substantially harder than the tire rim flange 13 which is conventionally made of hot rolled steel having a hardness of approximately 60 to 75 Rb.

As described above, the second leg portions 67 of the flexible legs 53 are disposed substantially radially. It will readily occur to those skilled in the art that, if desired, these leg portions 67 can be provided with slight circumferential components for enhanced prevention of angular movement or creep between the tire rim 12 and the wheel cover 22. This is not necessary, however, under ordinary conditions since the biting action between the points 68 and the flange surface 17 provides excellent circumferential retention as well as axial retention.

Figure 9:
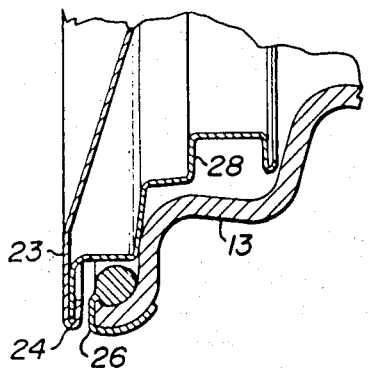
FIG. 9 is a view showing a peripheral portion of another embodiment of the retaining ring.

As indicated above, the trim member of FIGS. 1-8 is of a diameter preferably less than that of the outer margin 25 of the wheel flange 13 so that, if desired, wheel weights 26 can be mounted on the outer margin 25 of the flange 13 without interfering with the trim member 22. If desired, however, a trim member 22' covering the entire wheel assembly, including wheel weights 26', may be utilized as illustrated by FIG. 9.

Other modifications will, of course, be obvious to those skilled in the art. For example, the tire rim flange surface 17 may be provided with a uniform diameter rather than the illustrated slight variations in diameter between the portions 18 and 19. Similarly, the single point 68 may be replaced by two or more points or other means for bitingly engaging the flange surface 17.

While a particular embodiment of the invention has been shown and described, it will be understood that various changes and modifications may be made without departing from the spirit and scope of the invention, and it is intended to cover all such changes and modifications by the appended claims.

I claim:

1. A wheel trim member for use in a wheel structure including a tire rim having an annular axially extending and radially inwardly facing flange surface, said wheel trim member comprising:

a cover portion having a circular outer margin, a substantially rigid annular ring portion extending in a generally axial direction from said circular outer margin, the maximum diameter portion of said ring portion being smaller than the minimum diameter portion of the flange surface so that said wheel trim member can be mounted on the wheel structure with said ring portion coaxially disposed within the flange surface, and a plurality of angularly spaced-apart retaining members secured to the outer periphery of said ring portion and extending therefrom to resiliently engage the flange surface and thereby retain said wheel trim member in proper position when mounted on the wheel structure, said retaining members each comprising a base portion secured to said ring portion and at least one flexible resilient portion extending from said base portion, said flexible portion being movable through a range of positions bounded by an unflexed position and a fully flexed position, said angularly spaced-apart flexible portions in their unflexed positions extending radially to a diameter larger than the maximum diameter portion of the flange surface and in their fully flexed positions extending radially to a diameter smaller than the minimum diameter portion of the flange surface, whereby said flexible portions assume flexed positions intermediate said boundary positions when said wheel trim member is mounted on the wheel structure, said retaining members each further comprising a rigid portion extending radially outward from said base portion, said rigid portions extending radially to a diameter intermediate the diameters of said flexible portions in their flexed and fully flexed positions such that said rigid portions engage the flange surface and relieve the respective flexible portions of excessive bending loads under shock load conditions, said rigid annular ring portion being of radially stepped configuration, including a pair of axially spaced-apart annular walls disposed radially with their radially inner edges of substantially the same diameter, a first generally cylindrical wall interconnecting the radially inner edges of said radial walls so as to form therewith a circumferentially continuous radially outwardly opening channel, and a second general cylindrical wall interconnecting said circular outer margin and the radially outer edge of the radial wall adjacent thereto so as to form with said cover portion a circumferentially continuous radially inwardly opening channel, said base portions of said retaining members being secured to said first cylindrical wall and said rigid portions of said retaining members extending radially outward of said second cylindrical wall.

2. A wheel trim member for use in a wheel structure including a tire rim having an annular axially extending and radially inwardly facing flange surface, said wheel trim member comprising:

a cover portion having a circular outer margin, a substantially rigid annular ring portion extending in a generally axial direction from said circular outer margin, the maximum diameter portion of said ring portion being smaller than the minimum diameter portion of the flange surface so that said wheel trim member can be mounted on the wheel structure with said ring portion coaxially disposed within the flange surface, and a plurality of angularly spaced-apart retaining members secured to the outer periphery of said ring portion and extending therefrom to resiliently engage the flange surface an thereby retain said wheel trim member in proper position when mounted on the wheel structure, said retaining members each comprising a base portion secured to said ring portion and at least one flexible resilient portion extending from said base portion, said flexible portion being movable through a range of positions bounded by an unflexed position and a fully flexed position, said angularly spaced-apart flexible portions in their unflexed positions extending radially to a diameter larger than the maximum diameter portion of the flange surface and in their fully flexed positions extending radially to a diameter smaller than the minimum diameter portion of the flange surface, whereby said flexible portions assume flexed positions intermediate said boundary positions when said wheel trim member is mounted on the wheel structure, said retaining members each further comprising a rigid portion extending radially outward from said base portion, said rigid portions extending radially to a diameter intermediate the diameters of said flexible portions in their flexed and fully flexed positions such that said rigid portions engage the flange surface and relieve the respective flexible portions of excessive bending loads under shock load conditions, said retaining members being equally angularly spaced-apart and each of said retaining members being a one-piece element comprising a pair of flexible resilient portions projecting in opposite circumferential directions from said base portion, each of said flexible portions including a first elongated leg portion extending circumferentially and radially outward from said base portion to a remote end and a second leg portion extending substantially radially outward from said remote end, said second leg portion terminating at its radially outer end in means adapted to bitingly engage the flange surface;

and a rigid portion comprising a first portion projecting radially outward of said base portion adjacent said radial wall adjacent said circular outer margin and a second portion projecting axially from the radially outer end of said first portion toward said circular outer margin adjacent said second cylindrical wall.

* * * * *